Feb. 25, 1964  J. V. COLLINS  3,122,437
METHOD OF MAP REPRODUCTION ON A PORTION OF A SPHERE
Filed June 23, 1960
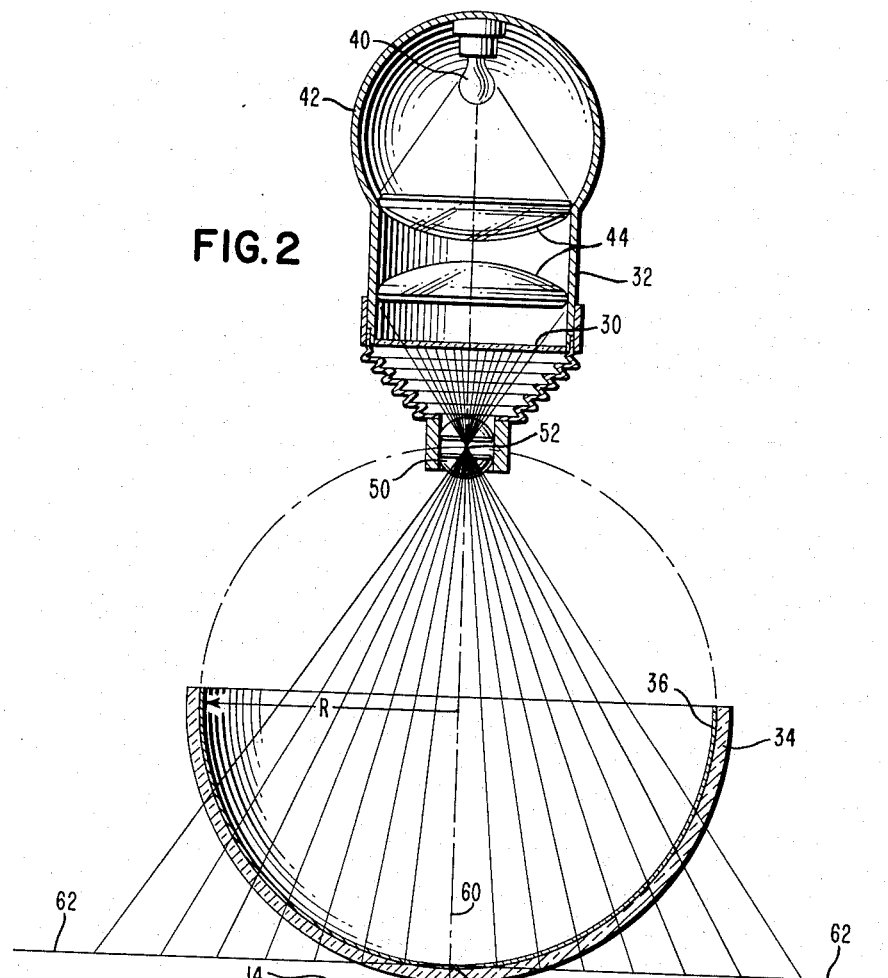
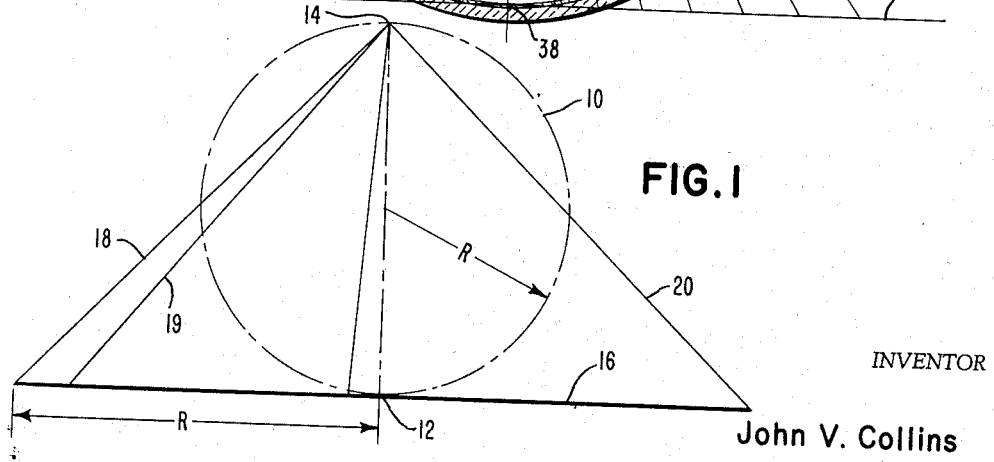
INVENTOR
John V. Collins
BY Sughrue, Rothwell, Mion & Zinn
ATTORNEYS

United States Patent Office 3,122,437
Patented Feb. 25, 1964

3,122,437
METHOD OF MAP REPRODUCTION ON A PORTION OF A SPHERE
John V. Collins, Owego, N.Y., assignor to International Business Machines Corporation, New York, N.Y., a corporation of New York
Filed June 23, 1960, Ser. No. 38,252
9 Claims. (Cl. 96—46)

This invention relates to a method of making global maps. More specifically, this invention relates to a method of producing maps on a hemisphere or other portion of a spherical shell by photographic and optical projection techniques while utilizing a two dimensional or flat map.

The global map produced by the preferred embodiment of the method of this invention is adapted to be utilized in the environment of an aircraft navigation system although it will be obvious to one skilled in the art that the invention is not limited to this particular adaptation. The invention can be utilized for making global maps with a high degree of accuracy to be used for any known purpose.

With the advent of supersonic aircraft it is apparent that an improved method of terrain recognition and navigation must be provided with the airborne system used in the aircraft. Because of the lack of interior room in the aircraft due to the complexity and bulk of navigational fire control systems and the like, there is no longer space for the navigator to examine standard maps. Also, because the navigator must accomplish his required duties in a supersonic aircraft in a shorter time than the past, maps must be provided for navigational operation in an extremely short period of time. To solve these problems it is currently the practice to provide a flat film strip projector which displays a section of terrain on a display screen. Because of the flat film strip the projection offers only a limited amount of information to the navigator and if the aircraft goes outside the corridor presented on the film the navigator must either have a film library containing all different films for projection or resort to navigating with standard maps. Therefore, it appears that the best way to provide a navigator or supersonic aircraft with a universal map displaying system is to provide a global hemisphere which could be positioned by a servo drive and any desired area thereof projected for navigational purposes.

At present, there are no known global hemispheres which have the required accuracy of detail and resolution that could be used for such purposes other than hemispheres on which the global map is manually constructed and therefore too costly. Present global hemispheres which are inaccurate due to problems in registration of different segments of the global map are not satisfactory for the above stated purpose.

There are a number of problems involved in making global maps, and these problems have been known for a number of years. As set out above, one of the problems in making a global map for navigational purposes is to provide a map with required detail, resolution and accuracy for subsequent projection. Another problem is providing a system for transferring a map from a two dimensional surface to a three dimensional spherical or hemispherical surface such as a globe. A quite common method of making ordinary global maps is the method of pasting connected gores and circular polar caps of printed maps onto a globe. However, these gores must be carefully stretched slightly by hand to match and hence the problems of registration are great. Photographic methods of producing global maps have been attempted but all known photographic techniques require that the image projected onto the map also be on a spherical surface; for example, see the patents to Miller et al. 2,491,386 and Campbell 2,537,329.

Since all of the known global map making methods require special materials and specially constructed three dimensional map images as well as costly hand working methods, it is an object of this invention to provide an improved global map making method utilizing a known type of flat map projection including built-in distortion together and in combination with a uniquely positioned optical projection system for projecting the known map onto a hemispherical shell coated with light sensitive material and positioned so that the projection will image on the hemispherical shell to compensate for the built-in distortion thereof and will provide the required resolution by being within the depth of field of a lens of the projection system.

Since the known photographic global map making techniques start with an expensively constructed photographic negative on a hemisphere, it is also an object of this invention to provide a photographic projection method of printing a flat map on a sphere or partially spherical surface with the latitude and longitude lines registered to negligible degree of error by utilizing known optical and photographic apparatus in a unique arrangement and thereby obtaining a resultant global map with a high degree of resolution.

Other objects of the invention will be pointed out in the following description and claims and illustrated in the accompanying drawings, which disclose, by way of example, the principles of the invention and the best mode which has been contemplated of applying these principles.

In the drawings:

FIG. 1 is a diagrammatic representation illustrating the geometrical construction of a conventional polar stereographic map.

FIG. 2 is a partially schematic illustration illustrating the process of this invention of projecting a reduced two dimensional polar stereographic map with required accuracy, resolution and definition on a photosensitive surface of a three dimensional hemisphere.

In general, this invention contemplates producing a global map on a photosensitive surface of a hemispherical shell by utilizing optical projection and photographic techniques in a unique arrangement. An available polar stereographic map having the desired size is first reduced to a smaller size photographic negative. A hemispherical shell constructed of a transparent material on which the map is to be placed is coated with a photosensitive coating. The polar stereographic map negative is then placed in a photographic enlarger and projected through a projection lens which is stopped down to provide a relative aperture which will give good resolution through a depth of field at least equal to the radius of the global hemisphere while being focused at a desired plane to allow the entire hemispherical shell to receive an image of the projected map in good focus. The photosensitive coated transparent global hemispherical shell having the light sensitive photographic emulsion on the surface thereof is placed in the path of the stereographic map image projection with its concave surface toward the projection lens and at a position with the pole of the hemispherical shell on the optical axis, at a distance equal to twice the radius of the hemisphere from a nodal point of the projection lens, and with a tangent to the pole of the hemisphere at right angles to the optical axis. It can be seen by this construction and by comparing FIGS. 1 and 2 that the optical projection is thus quite similar to the geometrical projection by which common polar stereographic maps are made thus enabling a standard polar stereographic flat map to be projected onto a three dimensional hemisphere with the required accuracy, resolution and registration.

In other words, the polar stereographic map is a known available map which has built-in distortion and this map is utilized with a substantially distortionless optical lens to project an image thereof into an image space. The hemispherical shell coated with the photographic emulsion is positioned in the projected image space in such a manner as to intercept the image of the map having the built-in distortion with varying degrees of magnification to completely compensate for the built-in distortion of the map in placing its image on the hemispherical shell.

Referring now to the drawings for a more detailed explanation of the invention, FIG. 1 illustrates diagrammatically the geometrical projection utilized in the construction of a conventional polar stereographic map. Polar stereographic maps are a well known type of map and have been constructed by geometrical projection using one pole of the earth as the center of the map and assuming a point at the other pole and extending lines from this point through all latitude points in the opposite hemisphere to intersect a plane which is tangent to the selected pole. In other words, referring to FIG. 1, dotted line 10 represents a theoretical sphere of the earth having a north pole 12 and a south pole 14. The polar stereographic flat map 16 is constructed with its center at the north pole 12 by extending lines 18, 19, 20, etc. through all latitude points in the northern hemisphere to intersect at a plane tangent to the north pole 12, this plane being represented by the flat two dimensional polar map 16. The final map consists of concentric latitude circles whose spacing increases as they approach the equator and of radial longitude lines. The radii of the latitude circles is a function of the hemisphere and the latitude range. The construction of a polar stereographic map and example of the map thereby constructed of the northern hemisphere is described in detail, for example, in the publication "Elements of Map Projection," U.S. Coast and Geodetic Survey, Special Publication #68, 5th edition, revised 1944, Government Printing Office, pages 37 and 38.

With such a polar stereographic map 16 the next step in the method of making a printed global map is to reduce this map to a desired size photographic negative 30, FIG. 2. The size of photographic negative may be calculated from conventinal optical formulas in order to be the correct size for projection from a modified photographic enlarger 32 onto a global hemispherical shell 34 of transparent material having a photosensitive coating 36. The modified enlarger 32 includes a conventional light source 40 within a housing 42, the light source being directed by a condensing lens system 44 into a modified lens 50 of the projector. Lens 50 is positioned with its nodal point 52 at the same position as the theoretical south pole or the pole of a hemisphere positioned complementary to hemisphere 34 as illustrated by dotted lines in FIG. 2.

The hemispherical shell 34 with the photosensitive coating 36 is placed such that the north pole 38 of the hemispherical shell is along the optical axis 60 and is spaced a distance equal to twice the radius R of the hemisphere from the nodal point 52, and with a tangent to the north pole 38 at right angles to the optical axis. Also the shell is positioned with its concave surface toward the projector 32, as shown in FIG. 1. In other words, the north pole 38 is positioned diametrically opposite the theoretical position of the south pole and the nodal point 52 of the lens 50 is coincident with the south pole position.

Prior to so positioning the hemispherical shell 34 the negative 30 is focused on a plane 62 tangent to the north pole 38 of the hemispherical shell, thus establishing an enlarged image of the polar stereographic map on plane 62. After such focusing the enlarger may be turned off and the hemispherical shell may be positioned as described above. Then the enlarger is turned on to project the image of polar map negative 30 into the image space of the projector. The photosensitive coating 36 on hemispherical shell 34 intercepts the image rays at different points to give varying degrees of magnification and, in effect, place the polar stereographic image in correct registration on the hemisphere as a true global map. In order to obtain the requisite definition of the projection in the image space on the photosensitive coating 36 on hemispherical shell 34, it is necessary to utilize the depth of field of the lens 50.

The depth of field of a lens refers to the distance in which all objects in the same plane parallel the lens will be in sufficient focus. The depth of field of a lens in a conventional photographic enlarger can be considerably increased by stopping down the diaphragm of the lens. It can be seen that if a negative is projected onto an enlarging easel that the easel can be moved parallel to the optical axis for considerable distance before the image becomes totally out of focus even though the magnification of the image changes. This is substantially similar to the situation illustrated in FIG. 2. The magnification of the image changes depending on where the image is intercepted by the photosensitive coating 36 while the lens 50 is stopped down to the point that the image will be in focus over the entire depth of field from plane 62 or below upwards for a distance to the top of the hemisphere, for example, for a distance at least equal to R, the radius of the hemispherical shell.

With a projection of the foregoing type and the lens relative aperture being sufficient to give a depth of field as required, the final resolution of the map projected on photosensitive coating 36 will be quite good and the errors of latitude and longitude points of the projection are limited only by the accuracy of the physical components including the aberrations of the lens 50.

After exposure to the projected image of the polar stereographic map from negative 30 the photosensitive coating has a latent image of the northern hemisphere thereon and is subsequently developed by known photographic processes to furnish the positive image. It can thus be seen that applicant has disclosed a novel and unique method of making a global map from a conventinal two dimensional polar stereographic map while utilizing known optical and photographic devices in a unique technique for projecting the image of a distorted two dimensional map onto a hemispherical shell and thereby producing a global map relatively free from distortion and errors of registration.

The following is an illustrating but non-limiting example:

*Example*

A glass hemispherical shell of approximately 7.250 inches in diameter was cleaned and prepared and the inside surface coated with a photographic emulsion.

The best position for the photographic negative is determined by the type of lens used for the projection thereof. One lens used was a Nikkor lens with a focal length of approximately 1 inch. The photographic negative was prepared from an Air Force navigational map of the northern hemisphere, the map being of the polar stereographic type and approximately 36 inches in diameter. This may was reduced to a photographic negative of approximately 2.4 inches in diameter and this negative was placed in a conventional enlarger having the lens thereof removed and replaced by the Nikkor lens. In order to accomplish the requisite resolution over the depth of field of at least 3.625 inches, it was necessary to calculate the aperture size from standard optical formulas and it was calculated the aperture required would be 0.166 inch or a relative aperture of approximately $f/60$. Since this was such a small aperture stop it was necessary to replace the conventional stop of the commercial lens with a special stop of this diameter.

Utilizing the physical parameter set out above and with certain small modifications, such as changing the negative size and the plane of focus, the resolution and distortion can be varied. Globes have been produced using the above described commercially available materials in the applicant's method to show a maximum error in latitude of less than 14 minutes. The accuracy could be even further improved by utilizing a more specially designed lens for eliminating lens aberration and more accurate hemispheres.

While in the embodiment of the present invention which has shown the photographic emulsion placed on the inside of the hemispherical shell, it should be quite clear that the teachings of the present invention could be practiced by placing the photographic emulsion on the outside surface of the hemisphere providing care is exercized in obtaining uniformity of image density and linearity of the image.

While there have been shown and described and pointed out the fundamental novel features of the invention as applied to the preferred embodiment, it will be understood that various omissions and substitutions and changes in the form and details of the method may be made by those skilled in the art without departing from the spirit of the invention. It is the intention, therefore, to be limited only as indicated by the scope of the following claims.

What is claimed is:

1. A method of producing a global map section comprising; providing a transparent dimensionally stable hemispherical shell with a photosensitive emulsion on one surface thereof, projecting a flat polar stereographic map through an optical projection lens having a relative aperture to provide accurate definition in a depth of focus at least equal to the radius of the hemispherical shell, positioning the photosensitive coated hemispherical shell concave surface toward the lens with a pole thereof on the optical axis with a tangent to the pole perpendicular to the optical axis and located a distance twice the radius of the hemisphere from a nodal point of the projection lens, exposing and developing the so positioned photosensitive coated hemispherical shell.

2. A method of producing a global map on the inside of a dimensionally stable hemispheric shell having a photosensitive emulsion thereon that comprises; reducing a polar stereographic map having the desired detail to a photographic negative, projecting the photographic negative of the reduced stereographic map through a projecting lens having a relative aperture which will give good resolution to a depth of field equal to at least the radius of the global sphere, positioning the hemispheric shell having the photosensitive emulsion on the surface thereof in the image field of said projection lens concave surface toward the lens with the pole of said sphere a distance equal to twice the radius of said hemisphere from a nodal point of said lens along the optical axis and with a tangent to the pole of said hemisphere perpendicular to said optical axis, exposing the photosensitive emulsion on said hemispheric shell to the image of the polar stereographic map with varying degrees of magnification so that the latent image on the photographic emulsion is a true global map, and subsequently developing the latent image on the photographic emulsion.

3. A method of placing a two dimensional map on a dimensionally stable transparent hemispheric shell which comprises; placing a photosensitive emulsion on the inner surface of a transparent hemispheric shell, reducing a polar stereographic map having desired detail to a reduced size negative, placing said reduced size negative of said polar stereographic map in an enlarger having a lens, the lens having a relative aperture to provide a depth of field at least equal to the radius of said hemispheric shell over a range of distance away from said lens of between twice the radius of the hemispheric shell and the radius of the hemispheric shell, positioning said hemispheric shell on the optical axis of said enlarger lens concave surface toward the lens a a position such that the photosensitive emulsion on the inner surface of said shell is a distance twice the radius of said shell from the nodal point of said lens and a plane tangent to said shell at a pole thereon is perpendicular to the optical axis of said lens, projecting the image of said negative through said lens of said enlarger on said photosensitive emulsion on said so positioned shell, and developing said emulsion to provide a positive image on the interior of said glass hemisphere.

4. A method of reproducing a flat two dimensional map on a three dimensional spherical surface, the method comprising; reducing a standard stereographic two dimensional map to a photographic negative, placing said photographic negative for projection in an optical projection system having a lens to produce an image in good focus throughout a large depth of field, positioning a section of a dimensionally stable spherical shell surface having a photosensitive coating thereon in the image space of said projection system in a manner such that a geometrical projection utilized in making said two dimensional map is reproduced by said optical projection system with a tangent to the spherical surface being in the same relative position as the two dimensional map in geometrical projection map making and a nodal point of a projection lens of the optical projection system at a point corresponding to a point diametrically opposite the tangent point in the geometrical projection, projecting the image of the two dimensional map through the optical projection system onto said spherical shell section thereby exposing the photosensitive coating thereon, and developing the photosensitive coating.

5. A method of producing a global map section comprising; projecting a standard two dimensional flat map made by a geometrical projection from a theoretical sphere representing the earth and thereby having built-in distortion through an optical projection system, focusing the projected image upon a plane a distance away from a projecting lens of the optical projection equal to at least twice a radius of a spherical shell section upon which the global map is to be produced, adjusting the relative aperture of said projecting lens to project a substantial depth of focus, positioning a portion of a dimensionally stable spherical shell having a photosensitive coating thereon in the image space of said projection with the concave surface of the shell toward the projecting lens such that a nodal point of the projection lens will coincide with a theoretical projection point utilized for making the geometrical projection of the map and such that a tangent to the photosensitive coating on said spherical shell will be perpendicular to the optical axis at a distance equal to twice the radius of the spherical section from the nodal point of the lens, thereby exposing the photosensitive coating, and developing the so exposed coating.

6. A method of producing a global map on a dimensionally stable section of a spherical shell comprising; providing a dimensionally stable portion of a spherical shell with photosensitive coating, projecting a two dimensional stereographic map made by geometrical projection from a theoretical sphere through an optical projection lens having a relative aperture to provide a definition and depth of focus in a range at least equal to the radius of the sphere from which said spherical shell section is taken, positioning the spherical shell section with the photosensitive coating thereon along the optical axis concave surface toward the lens with a tangent to the spherical section perpendicular to the optical axis and located a distance twice the radius of the sphere from a nodal point of the projection lens, exposing the photosensitive coating on the spherical section so positioned by said optical projection, and developing the latent image on the exposed photosensitive coating.

7. A method of producing a global map on the surface of a dimensionally stable portion of spherical shell having a photosensitive coating applied thereto that comprises; providing a stereographic map made by a geometrical projection tangent to a theoretical sphere with the desired detail in the form of a photographic negative, positioning the photographic negative in an optical projection system having a projecting lens with a relative aperture which will give accurate resolution to a depth of field equal to at least the radius of the sphere from which the section is taken, positioning the spherical shell portion having the photosensitive coating thereon in the image field of said projection lens concave surface toward the lens with a tangent to the coating on the shell perpendicular to the optical axis at a distance equal to twice the radius of the sphere from a nodal point of said lens along said optical axis, exposing the photosensitive coating on said spherical shell portion to the image of said stereographic map by said projection system with varying degrees of magnification because of the so positioned sphere so that the latent image on the photosensitive coating is a true global map, and developing the latent image of the true global map on the photosensitive coating on the spherical shell portion surface.

8. A method of making a global map on the surface of a section of dimensionally stable spherical shell comprising, providing a flat two dimensional map made by geometrical projection means from a projection point of a sphere representing the earth whereby the map includes built-in distortion, positioning this map in an optical projection system for projecting the map through a nodal point of a projection lens into an image field, positioning a portion of a spherical shell with a photosensitive coating thereon in the image field of the optical projection system concave surface toward the projection lens to substantially recreate the geometrical projection by which the map was made such that the varying degrees of magnification caused by interception of the image at varying distances from the nodal point of the projection lens by said spherical shell surface will completely compensate for the built-in distortion of the projected flat map, exposing the photosensitive coating of the so positioned spherical shell section to produce the image of the flat map having built-in distortion upon the spherical shell section without any distortion, and developing the so exposed photosensitive coating.

9. A method of producing a global map on the surface of at least a portion of a dimensionally stable spherical shell by photographic analogy techniques, the method comprising; providing a projectable flat two dimensional map made by geometrical projection from a projection point of a theoretical sphere representing the earth, the map thus containing built in distortion, projecting said map through an optical projection system having a lens with a nodal point and a depth of field equal to at least the depth of the section of the spherical global map to be produced, positioning a portion of a spherical shell having a photosensitive coating thereon in the depth of field of the optical projection system and relating the nodal point of the projection system with the spherical shell such that the spherical shell will have the same relative position to the nodal point as the theoretical sphere representing the earth had to its projection point, exposing the photosensitive coating on the spherical shell to the image of the projected map, and developing the so exposed coating.

References Cited in the file of this patent
UNITED STATES PATENTS

| | | |
|---|---|---|
| 1,456,954 | Von Lucken | May 29, 1923 |
| 1,858,786 | Myers | May 17, 1932 |
| 2,431,847 | Van Dusen | Dec. 2, 1947 |
| 2,491,386 | Miller et al. | Dec. 13, 1949 |
| 2,537,329 | Campbell | Jan. 9, 1951 |
| 2,643,598 | Carroll | June 30, 1953 |
| 2,792,746 | O'Brien | May 21, 1957 |